(12) United States Patent
Ishiyama et al.

(10) Patent No.: US 10,592,772 B2
(45) Date of Patent: Mar. 17, 2020

(54) IMAGE CAPTURING ATTACHMENT TOOL, WORK MANAGEMENT METHOD, SYSTEM, COMPARISON DEVICE, AND PROGRAM

(71) Applicant: NEC CORPORATION, Tokyo (JP)

(72) Inventors: Rui Ishiyama, Tokyo (JP); Takayuki Abe, Kanagawa (JP); Kayato Sekiya, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 60 days.

(21) Appl. No.: 15/561,562

(22) PCT Filed: Mar. 24, 2016

(86) PCT No.: PCT/JP2016/059452
§ 371 (c)(1),
(2) Date: Sep. 26, 2017

(87) PCT Pub. No.: WO2016/158690
PCT Pub. Date: Oct. 6, 2016

(65) Prior Publication Data
US 2018/0089535 A1    Mar. 29, 2018

(30) Foreign Application Priority Data
Mar. 27, 2015   (JP) .................... 2015-066499

(51) Int. Cl.
*B25B 23/14*     (2006.01)
*G06K 9/46*      (2006.01)
(Continued)

(52) U.S. Cl.
CPC ............ *G06K 9/6202* (2013.01); *B25B 13/46* (2013.01); *B25B 23/00* (2013.01); *B25B 23/14* (2013.01);
(Continued)

(58) Field of Classification Search
None
See application file for complete search history.

(56) References Cited

U.S. PATENT DOCUMENTS

2005/0174473 A1* 8/2005 Morgan ............. H05B 33/0803
                                                            348/370
2015/0189238 A1   7/2015 Ishiyama et al.
(Continued)

FOREIGN PATENT DOCUMENTS

JP    2009-099100 A    5/2009
JP    2009-107114 A    5/2009
(Continued)

OTHER PUBLICATIONS

International Search Report for PCT/JP2016/059452 dated Jun. 7, 2016 [PCT/ISA/210].
(Continued)

*Primary Examiner* — Idowu O Osifade
(74) *Attorney, Agent, or Firm* — Sughrue Mion, PLLC

(57) ABSTRACT

An attachment tool includes an image capturing unit configured to capture an image of a random pattern provided on a comparison region of a part; and an identification result-outputting unit configured to output a part identification result obtained by comparing an image characteristic of the captured image of the random pattern with a previously stored image characteristic of a random pattern of a part.

17 Claims, 18 Drawing Sheets

(51) Int. Cl.
  *G06K 9/00* (2006.01)
  *G06K 9/32* (2006.01)
  *B25B 23/00* (2006.01)
  *B25B 13/46* (2006.01)
  *G05B 19/12* (2006.01)
  *G05B 19/406* (2006.01)
  *G06K 9/22* (2006.01)
  *G06K 9/24* (2006.01)
  *G06K 9/62* (2006.01)
  *G06Q 50/04* (2012.01)
  *B25B 13/00* (2006.01)
  *B25B 15/00* (2006.01)

(52) U.S. Cl.
  CPC ......... *G05B 19/124* (2013.01); *G05B 19/406* (2013.01); *G06K 9/00577* (2013.01); *G06K 9/228* (2013.01); *G06K 9/24* (2013.01); *G06K 9/3233* (2013.01); *G06K 9/46* (2013.01); *B25B 13/00* (2013.01); *B25B 15/00* (2013.01); *G05B 2219/25294* (2013.01); *G05B 2219/50203* (2013.01); *G06Q 50/04* (2013.01)

(56) References Cited

U.S. PATENT DOCUMENTS

2016/0048730 A1    2/2016  Ishiyama
2016/0191434 A1*   6/2016  Rice .................. H04L 51/38
                                                      709/204

FOREIGN PATENT DOCUMENTS

| JP | 5165548 B2 | 3/2013 |
| JP | 2013-230547 A | 11/2013 |
| JP | 2014-166662 A | 9/2014 |
| JP | 2014-170446 A | 9/2014 |
| WO | 2013/191281 A1 | 12/2013 |
| WO | 2014/163015 A1 | 10/2014 |

OTHER PUBLICATIONS

Notice of Reasons for Refusal dated Jan. 31, 2020 in counterpart Japanese Patent Application No. 2017-509876.

* cited by examiner

BLACK GROUND BECOMES LARGER AS
$\theta$ BECOMES LARGER, AND BLACK-APPEARING
PORTION ON THE SATIN SURFACE ALSO
BECOMES LARGER BLACK GROUND BECOMES SMALLER AS
$\theta$ BECOMES SMALLER, AND BLACK-APPEARING
PORTION ON THE SATIN SURFACE ALSO
BECOMES SMALLER

FIG. 9

| IMAGE CHARACTERISTIC DATA | SPECIFICATION/ KIND OF PART | WORK PARAMETER | TO-BE- ATTACHED POSITION |
|---|---|---|---|
| xxxxxxxxxxxxxx | xxxxxx | xx | xxxxxx |
| xxxxxxxxxxxxxx | xxxxxx | xx | xxxxxx |
| ⋮ | ⋮ | ⋮ | ⋮ |

FIG. 15

| IMAGE CHARACTERISTIC DATA | WORK DATE | WORK TYPE | TO-BE-ATTACHED POSITION | STATE (TORQUE VALUE, ETC.) |
|---|---|---|---|---|
| xxxxxxxxxxxxxx | XX/XX/XX | ATTACHING | xxxxxx | xxxxxx |
| | XX/XX/XX | CHECKING | xxxxxx | xxxxxx |
| | ⋮ | ⋮ | ⋮ | ⋮ |
| xxxxxxxxxxxxxx | XX/XX/XX | ATTACHING | xxxxxx | xxxxxx |
| | XX/XX/XX | CHECKING | xxxxxx | xxxxxx |
| | ⋮ | ⋮ | ⋮ | ⋮ |
| ⋮ | | | | |

IMAGE CAPTURING ATTACHMENT TOOL, WORK MANAGEMENT METHOD, SYSTEM, COMPARISON DEVICE, AND PROGRAM

CROSS REFERENCE TO RELATED APPLICATIONS

This application is a National Stage of International Application No. PCT/JP2016/059452, filed on Mar. 24, 2016, which claims priority from Japanese Patent Application No. 2015-066499, filed on Mar. 27, 2015, the contents of all of which are incorporated herein by reference in their entirety.

TECHNICAL FIELD

The present invention relates to an attachment tool, a work management method, a system, a comparison device, and a program.

BACKGROUND ART

In attaching or checking of a part such as a bolt, confirmation of a kind or individual of the part makes human operation complicated, which frequently invites occurrence of human error.

In view of the above, it is considered to attach an identification tag to each individual part for the purpose of improvement of work efficiency for confirming a part. For example, Patent Literature 1 discloses a screw tightening management system in which an identification code, e.g., a one-dimensional code and a two-dimensional code, attached to a component, etc. to be fastened by screws is read out by using a personal digital assistant and the read-out identification code is sent to a management device. Also, Patent Literature 2 discloses a work management system in which an identification code, e.g., a one-dimensional code and RFID, attached to a work object is read out by a torque wrench and the read-out identification code is sent to a working terminal.

CITATION LIST

Patent Literature

[PATENT LITERATURE 1]
Specification of JP 5165548
[PATENT LITERATURE 2]
JP 2014-170446

SUMMARY OF INVENTION

Technical Problem

In a case of identifying a large number of parts for use, the methods disclosed in Patent Literature 1 and Patent Literature 2 are not practical because the methods in which an identification tag is attached to every part are costly.

The present invention was made in order to solve the above problem. An exemplary object of the present invention is to provide an attachment tool, a work management method, a system, a comparison device, and a program capable of improving work efficiency for attaching, checking, etc. of parts without necessitating a large cost.

Solution to Problem

An attachment tool according to an exemplary aspect of the invention includes an image capturing unit configured to capture an image of a random pattern provided on a comparison region of a part and an identification result-outputting unit configured to output a part identification result obtained by comparing an image characteristic of the captured image of the random pattern with a previously stored image characteristic of a random pattern of a part.

A work management method according to an exemplary aspect of the invention includes capturing an image of a random pattern provided on a comparison region of a part by an attachment tool and outputting a part identification result obtained by comparing an image characteristic of the captured image of the random pattern with a previously stored image characteristic of a random pattern of a part by an attachment tool.

A work management system according to an exemplary aspect of the invention includes an attachment tool including an image capturing unit configured to capture an image of a random pattern provided on a comparison region of a part and an identification result-outputting unit configured to output a part identification result obtained by comparing an image characteristic of the captured image of the random pattern with a previously stored image characteristic of a random pattern of a part and a comparison unit configured to compare the image characteristic extracted from the image of the random pattern captured by the image capturing unit with the previously stored image characteristic of the random pattern of the part, the image characteristic being stored in an image characteristic storage unit.

A comparison device according to an exemplary aspect of the invention is configured to compare an image characteristic extracted from an image of a random pattern provided on a comparison region of a part, the image being captured by an attachment tool, with a previously stored image characteristic of a random pattern of a part, the image characteristic being stored in an image characteristic storage unit.

A program according to an exemplary aspect of the invention causes a computer to execute processing including comparing an image characteristic extracted from an image of a random pattern provided on a comparison region of a part to be subjected to work, the image being captured by an attachment tool, with a previously stored image characteristic of a random pattern of a part, the image characteristic being stored in an image characteristic storage unit.

Advantageous Effect of Invention

According to the present invention, work efficiency for attaching, checking, etc. of a part can be improved without involving a large cost.

BRIEF DESCRIPTION OF DRAWINGS

FIG. 9 illustrates an example of data to be registered in a part database.

FIG. 15 illustrates an example of data to be registered in a work record database.

DESCRIPTION OF EXEMPLARY EMBODIMENTS

Initially, a background of the present invention will be described below for facilitating understanding of the present invention.

For example, by a plurality of employees in a factory, at different places or at remote places, a large number of parts such as bolts are used for products that are manufactured in large quantities, and similar operations are repeated for attaching the parts. In the operation, the individual person is required to select a part correctly, set a work parameter correctly, and attach a part efficiently and shortly. A work manager is required to have a confirmation means for minimizing errors in work and improve efficiency for the whole work by statistically processing for work efficiency and accuracy (number of errors) of each of the individual person-in-charge and a part. In order to perform checking/recording of work for attaching an individual part, it is the only way to manually perform confirmation/recording of the work. This, however, could not avoid human error. Also, it was difficult to perform statistical analyzation in view of the cost involved therein because a vast volume of records had to be collected.

Specially, individual identification of a part, i.e., identification of a part among error-prone similar parts and identification of a part that being checked visually, was performed by a person. Therefore, it was difficult to obtain big data because occurrence of human error was unavoidable and recording was not practically possible in view of working cost involved thereto.

According to the present invention, identification of an individual or a kind of a part is performed within a tool or in cooperation with the other device concurrently with attaching of the part. This contributes to identification of parts to be attached and prevention of human errors without increasing work cost. Further, it can be realized to obtain work record for each part automatically.

First Exemplary Embodiment

A first exemplary embodiment of the present invention will be described below.

Figure 1:
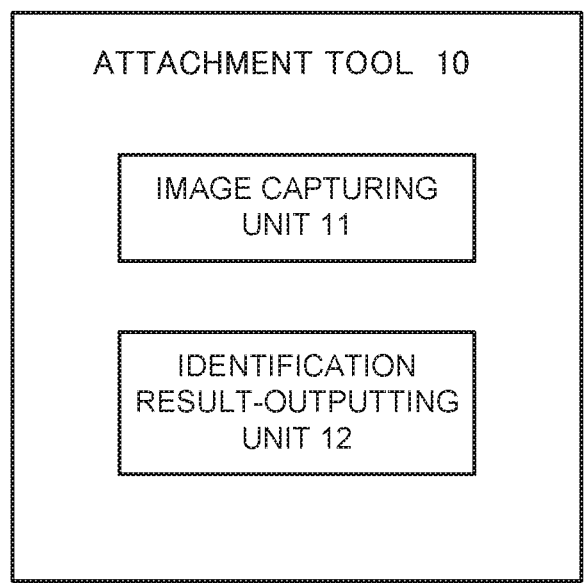
FIG. 1 is a block diagram of a first exemplary embodiment.

FIG. 1 is a block diagram of the first exemplary embodiment of the present invention.

The first exemplary embodiment of the present invention is an attachment tool 10 including an image capturing unit 11 configured to capture an image of a random pattern provided on a comparison region of a part to be subjected to work and an identification result-outputting unit 12 configured to output a part identification result obtained by comparing an image characteristic of the image of the random pattern and a previously stored image characteristic of a random pattern of a part.

A part is a part to be attached to a product or the other part by an attachment tool. Examples of a part include bolts, screws, nuts, lenses, switches, semiconductor chips, plastic parts, fastening parts (slide fasteners, hook and loop fasteners, snap fasteners, rail fasteners, buckles, code stoppers, belt adjusters, swivels, snap buttons, buttons, etc.), etc.

A random pattern is a concave/convex pattern provided on a comparison region of a part. A random pattern is provided via satin processing, emboss processing, etc. A concept of random pattern also includes a case where a random pattern is formed on purpose in order to use it for identification or comparison of an object in addition to a case where a random pattern is formed as a design. Further, the concept of random pattern also includes wrinkle patterns (embosses), etc. obtained via surface processing (e.g., emboss processing) to leather products in addition to a satin design processed on metal or synthetic resins (plastic, etc.).

The attachment tool 10 is a tool used in attaching a part to a product or the other part. The attaching tool 10 includes, for example, a torque wrench, a screw driver, and a wrench.

A comparison region can be set to anywhere in so far as the region is provided with a random pattern. When considering easiness for performing comparison processing, it is desirable that a region where the image capturing unit 11 can capture an image thereof at a time when a part is subjected to attaching work while the part is gripped by a part gripping unit of the attachment tool is set as a comparison region.

Figure 2:
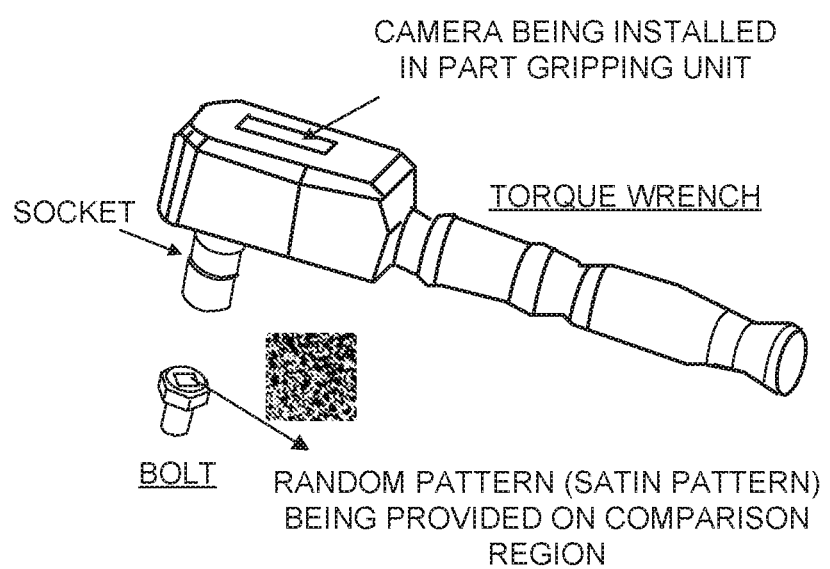
FIG. 2 illustrates an exemplary case where an attachment tool is a torque wrench.
Figure 3:
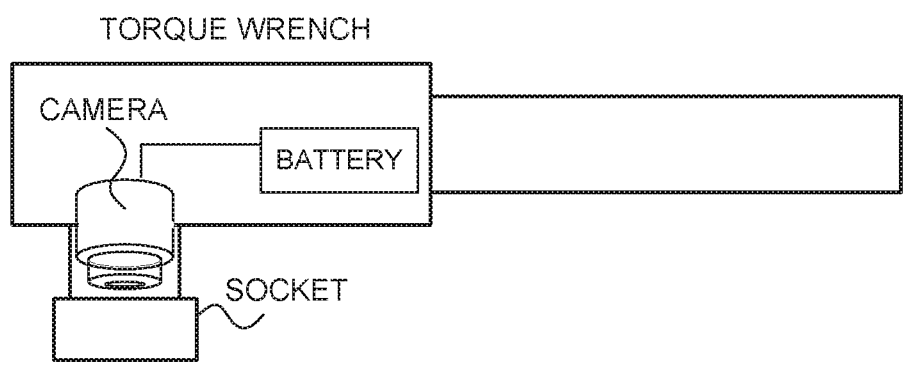
FIG. 3 illustrates a camera built in the attachment tool.

FIG. 2 illustrates an example of a case where a part is a bolt and the attachment tool 10 is a torque wrench. In the example of FIG. 2, a comparison region on a head portion of a bolt is provided with a random pattern. As illustrated in FIG. 3, the image capturing unit 11 (camera) is installed in a part gripping unit of a torque wrench in such a manner that the image capturing unit 11 faces to a surface of the bolt head portion while the bolt is fit to a socket of the torque wrench for fastening the bolt. With the configuration, an image of a random pattern of a part can be captured while attaching the part.

Figure 4:
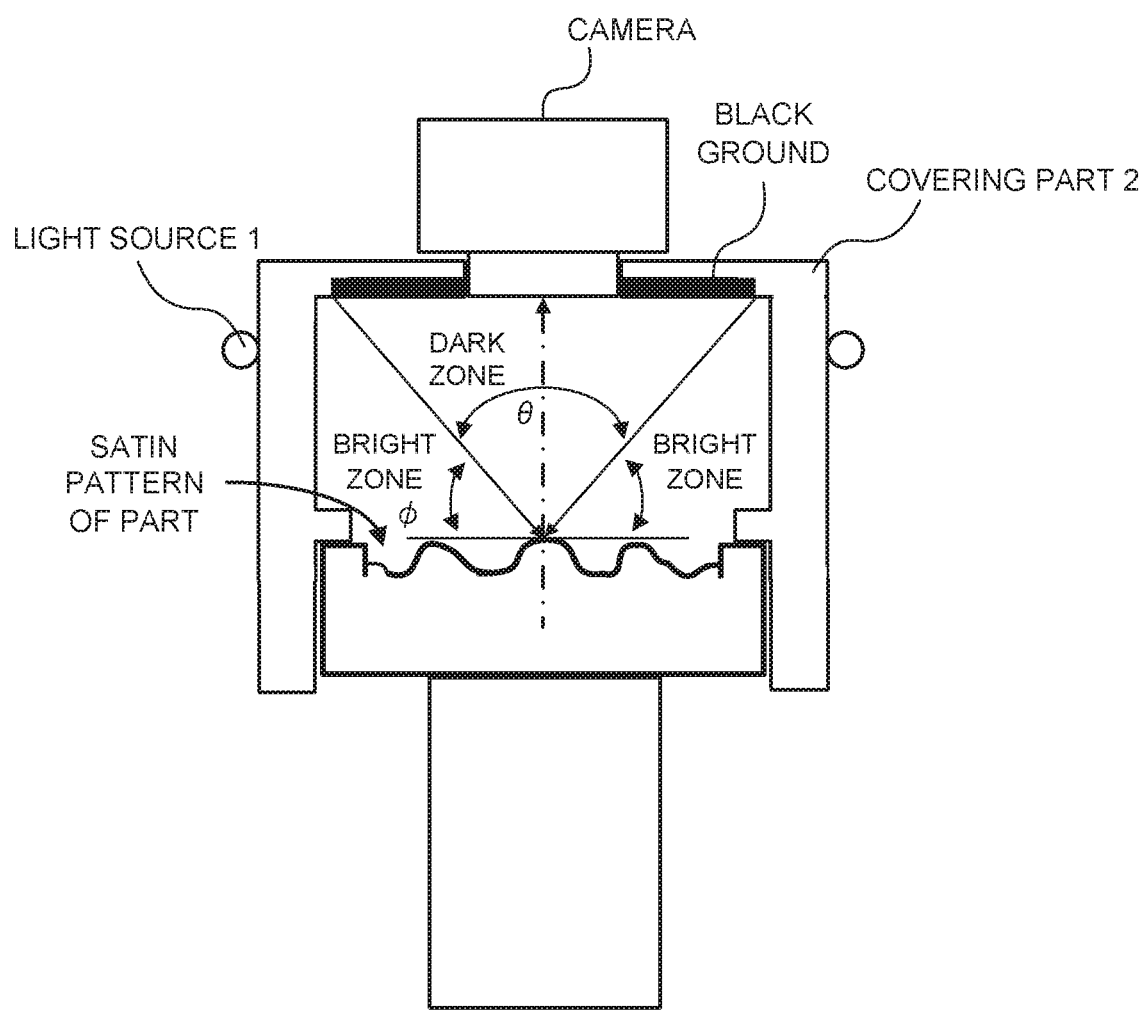
FIG. 4 illustrates a photographing auxiliary part.

Incidentally, it is possible to use a photographing auxiliary part for obtaining an image having an enhanced bright-dark contrast in addition to the attachment tool 10. FIG. 4 illustrates the photographing auxiliary part. The photographing auxiliary part serves to support capturing of an image of a comparison region on an object surface including a fine concave/convex and having strong specular reflection, e.g., a comparison region in a satin surface including a satin design. The photographing auxiliary part includes light source 1 applying light and a covering part 2 having a shape covering a prescribed area on a surface of a part or a product. The covering part 2 is composed of a portion of a surface that corresponds to a range in a predetermined angle from a normal direction and other portions of the surface. Each of the other portions corresponds to a range in an angle other than the above predetermined angle. The portion of the surface that corresponds to the range in the predetermined angle from the normal direction is a light absorbing black ground. Each of the other portions corresponds to the range in the angle other than the above predetermined angle includes light source 1 or light source area-surface serving to disperse and emit light applied from the light source 1.

The covering part 2 includes, for example, an upper surface portion and side surface portions. The upper surface portion is in parallel with the satin surface, provided with an image capturing hole for capturing an image from a normal direction of the satin surface, and has a black ground region facing to the satin surface. The side surface portions are perpendicular to the upper surface and made of a member capable of dispersing light from the light source 1.

The black background zone of the covering part 2 is determined by an angular range θ of a dark zone and angular ranges φ of bright zones to a normal line of a surface of the comparison region in the satin surface of the part (e.g., an apex surface of a convex part at a center of the comparison region). As described above, a distribution of the black ground surface and the dispersing surface is defined only by the angular range to the normal direction of the satin surface. A shape of or an angle to the surface is arbitrary. In other words, the dispersing surfaces of the member were made to be perpendicular to the black ground surface, but this is a mere example, and any shape or angle can be employed. Similarly, it is not necessary that the black ground is formed into a flat surface. The black ground may be formed into any shape in so far as the black ground can cover all the range in an angle θ from the normal line of the satin surface.

Figure 5:
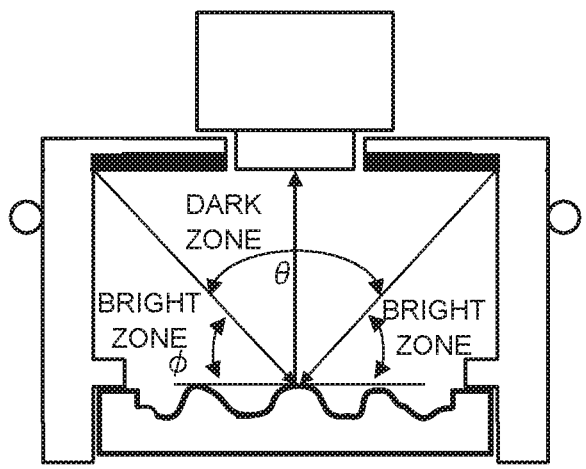
FIG. 5 illustrates a black background zone of a covering part of FIG. 3.
Figure 5:
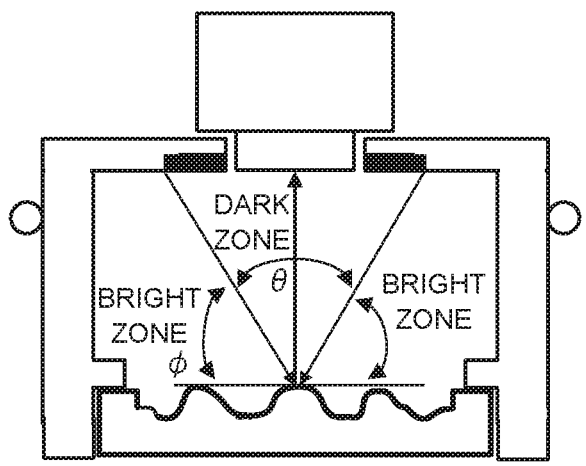

The black background zone of the covering part 2 does not reflect illumination light from the light source 1, so that the apex portion of the convex part of the statin surface facing to the camera fit in the image capturing hole in the upper surface will appear black. As illustrated in FIG. 5, there is such a relationship between a size of the black background zone of the covering part 2 and the angular range θ of the dark zone that the black background zone of the covering part 2 becomes larger as the angular range θ of the black dark zone becomes larger, whereas, the black background zone of the covering part 2 becomes smaller as the angular range θ of the dark zone becomes smaller. Further, the black-appearing portion of the satin surface becomes larger as the black background zone of the covering part 2 becomes larger, whereas, the black-appearing portion of the satin surface becomes smaller as the black background zone becomes smaller. In the present exemplary embodiment, the angular ranges θ and φ are adjusted in such a way that the number of black pixels within a comparison region in an image of a satin surface or a degree of separation of a luminance value of an image within a comparison region comes to be a predetermined value (e.g., 25%). More specifically, it is possible to change a size of the black background zone of the covering part 2 or it is possible to change a height of the side surfaces of the covering part 2. Various methods are employable for the changing. For example, in a case of employing a screw mechanism capable of moving the black background zone up and down, a height of the side surfaces of the covering part 2 can be adjusted by rotating the screw mechanism. This is a mere example and thus other various methods can also be employed.

Because an actual size of concave/convex of satin pattern changes according to a parameter of a to-be-identified part or a to-be-identified product upon processing thereof, a luminance distribution of an image is optimized by adjusting the angular ranges θ, φ for optimization of a size of black background zone. Incidentally, such a luminance value is used as a threshold at binarization that a first deviation of a histogram of the luminance change becomes maximum. Incidentally, the black background zone is not limited to a black color but can be dark colors capable of absorbing light.

Accordingly, an apex portion of a convex part of a satin surface having a normal line in a direction facing to a camera appears black in an image, and a concave part of a satin surface not facing to a camera appears white in an image because the concave part receives reflection light from various directions. As a result, an image having an enhanced blight-dark contrast can be obtained for the concave/convex part, and thus an apex portion can be easily constantly extracted as a characteristic point. Alternatively, it is possible to use a modification of the photographing auxiliary tool disclosed in Patent Application No. 2012-172701, the modification being made to incorporate the photographing auxiliary tool in an attachment tool as illustrated in FIG. 4 and FIG. 5.

It is possible to use any form for outputting a part identification result by the identification result-outputting unit 12. For example, the identification result-outputting unit 12 can include at least one of a lump, a buzzer, and a display, and output a part identification result via lighting of lump, sound emission from buzzer, displaying on a display, etc.

Figure 6:
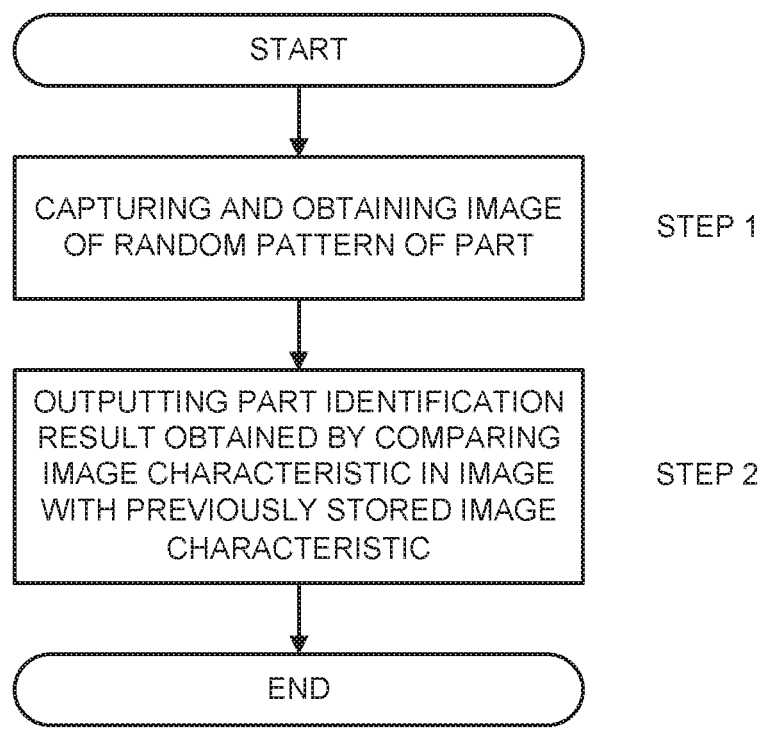
FIG. 6 is a flow chart illustrating an operation of the attachment tool of the first exemplary embodiment.

Now, an operation of the attachment tool 10 in the first exemplary embodiment will be described below referring to a flow chart of FIG. 6.

Initially, before attaching a part to somewhere, the part is gripped by the attachment tool 10. The image capturing unit 11 captures and obtains an image of a random pattern of the part gripped by the attachment tool 10 (Step 1).

Then, the identification result-outputting unit 12 outputs a part identification result obtained from comparison processing for comparing an image characteristic in the image of the random pattern of the part with a previously stored image characteristic of a random pattern of a part (Step 2).

As described above, identification of a part is performed concurrently with attaching of the part, thereby saving work cost. Also, identification of a part to be attached enables to avoid human error.

Second Exemplary Embodiment

A second exemplary embodiment will be described below. The second exemplary embodiment is directed to a system causing a server side to perform comparison processing of an image of a random pattern of a part, the image being captured by an attachment tool.

Figure 7:
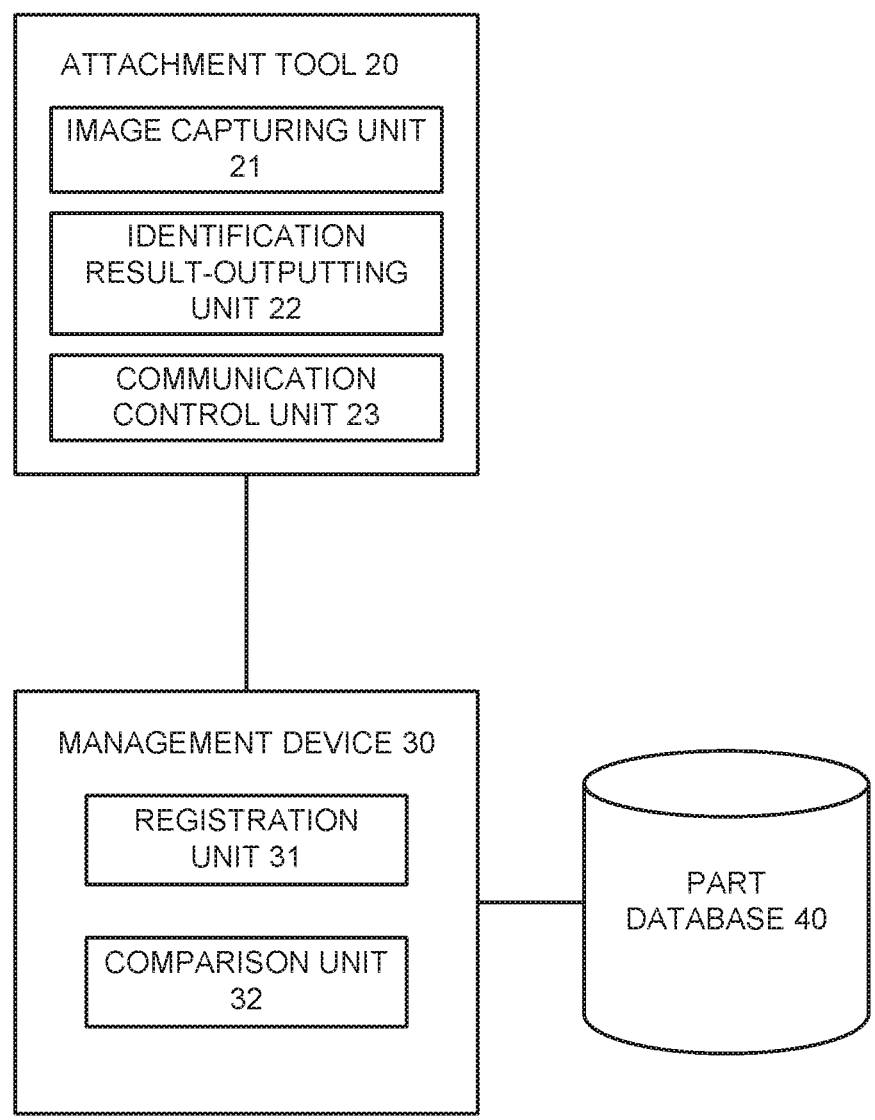
FIG. 7 is a block diagram of a second exemplary embodiment.

FIG. 7 is a block diagram of a work management system according to the second exemplary embodiment.

The work management system according to the second exemplary embodiment includes an attachment tool 20, a management device 30, and a part database 40. These components are connected with each other via a network.

The attachment tool 20 includes an image capturing unit 21, an identification result-outputting unit 22, and a communication control unit 23.

The image capturing unit 21 has a function and a configuration equivalent to those of the image capturing unit 11 of the first exemplary embodiment and sends an image to the management device 30 via the communication control unit 23.

The identification result-outputting unit 22 has a function and a configuration equivalent to those of the identification result-outputting unit 12 of the first exemplary embodiment and outputs a part identification result received from the comparison device 30 via the communication control unit 23.

The communication control unit 23 controls communication with the management device 30 via a network.

The management device 30 is a server including a registration unit 31 and a comparison unit 32.

The registration unit 31 registers an image characteristic of a random pattern provided on a part in the part database 40.

Here, processing for providing a random pattern on a part is roughly divided into two methods.

One is a processing method in which a satin design is provided on a die that is used for manufacturing a part or a product by injection molding or casting. It is possible to use various methods such as etching or blasting for applying satin processing to a die. In a typical method, a satin grain size, etc. can be controlled but a position and a size of each individual fine concave/convex cannot be accurately reproduced and thus a random pattern is generated at each processing. As a result, in a case where a plurality of dies for manufacturing the same type of objects is made, fine concave/convex in a satin-processed-region differs for each die. As a matter of course, upon producing an imitation, it is possible to copy a die which looks the same at a glance. It is, however, hard to copy every fine concave/convex of satin pattern completely. According to the processing method, it is possible to provide almost the same satin design to all individuals manufactured from the same die. To the contrary, a different die has a different detailed characteristic of a satin design. In the processing, at least one of a group of individuals (group of objects) manufactured by the same die is to be selected and an image characteristic of a satin design in a comparison region 4 of the individual is to be registered in the part database 40 as a typical value to be used for identification reference. According to the method, a part of which image characteristic is similar to a registered image characteristic by a degree more than a prescribed similarity degree can be identified as a part on which a satin design thereof is formed by the same die. More specifically, there is such an advantage that a group of individuals (a group of parts) manufactured by a specific die can be compared with a small quantity of registration data.

Incidentally, in the above description, exemplified, but not limited thereto, is a case where at least one of the group of individuals (group of objects) manufactured by a specific die is selected and an image characteristic of a satin design in a comparison region of the selected individual is registered as a typical value to be used for identification reference. For example, such a configuration is also employable that an image of a satin portion of a die (a portion of part, etc. where satin processing is applied) is obtained and the obtained image is registered. In this case, a concave/convex pattern of a satin design of a part, etc., the pattern being formed via satin processing by using a die, becomes a pattern having a concave/convex reverse to the concave/convex pattern of the satin portion of the die. Therefore, a to-be-registered image of the satin portion of the die (a portion of part, etc. where satin processing is applied) is an image (image characteristic) having a luminance value reverse to that of the to-be-registered image. With the configuration, at comparison, the image of the satin design in the comparison region of the part can be used for comparison as it is.

Further, the following configuration is also employable that an image of a satin portion of a die (a portion of part, etc. where satin processing is applied) that is to be registered in a part database 40 is registered as it is without reversing a luminance value of the image, and, at comparison, the luminance value of the image of the satin design in the comparison region 4 of the individual such as a part is reversed for comparison.

Figure 8:
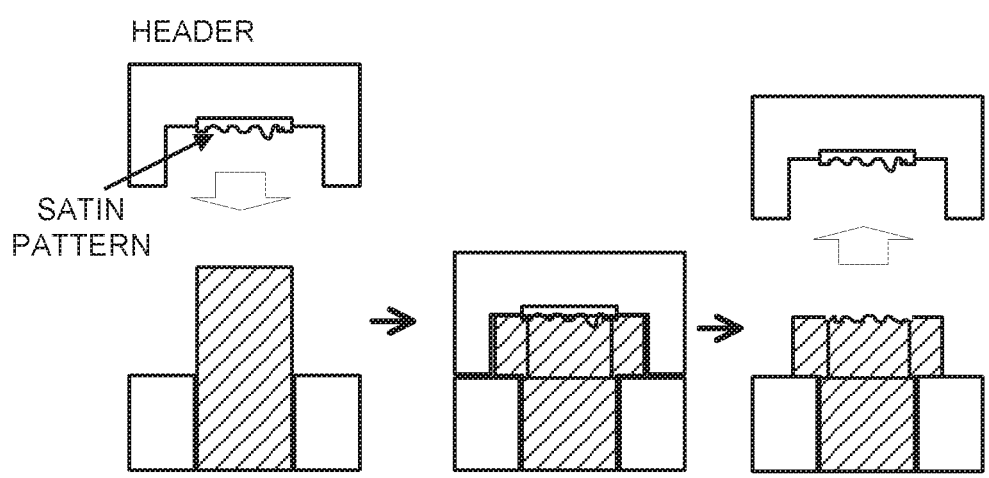
FIG. 8 illustrates an exemplary case where a satin pattern is provided on a bolt in a manufacturing step of the bolt.

For example, in a case where a part is a bolt, as illustrated in FIG. 8, a dedicated header applied with satin processing can be used in the manufacturing step. In a heading step by the header, a satin pattern can be copied onto the bolt side.

The other exemplary methods include satin processing for generating a random fine concave/convex pattern for each individual, the processing including etching, blasting, cutting, crystal/powder coating, dispersion plating, etc., or processing for generating fine surface concave/convex by plating or coating. According to such processing, a resulting satin design differs for each individual. An image characteristic of the satin design formed on the comparison region is registered in the part database 40 for each individual (for each part or product). According to the method, there is an advantage that comparison (identification) can be performed by individual unit for a part because the satin design differs for each individual (for each part).

Further, the registration unit 31 stores information of a specification and a kind, a work parameter (a torque value), an attaching place, etc. of a part in association with an image characteristic thereof. An example of data to be registered in the part database 40 is illustrated in FIG. 9.

The comparison unit 32 extracts an image characteristic from an image of a to-be-compared random pattern received from the attachment tool 20 and compares the extracted image characteristic with an image characteristic of a random pattern of a part, the image characteristic being registered in the part database 40. Here, for example, if the matched number of feature points in the corresponding positions (a range within a certain threshold) is a predetermined number or more, the comparison unit 32 performs comparison processing for determining that the both parts are matched, and sends a comparison result thereof to the attachment tool 20. In the comparison processing, in a case where an image characteristic which coincides with a to-be-compared image characteristic is found in the part database 40, the comparison unit 32 sends a comparison result indicating matching, whereas, in a case where an image characteristic which coincides with a to-be-compared image characteristic is not found in the part database 40, the comparison unit 32 sends a comparison result indicating mismatch.

Further, in the comparison processing, it is also possible that, in a case where an image characteristic which coincides with a to-be-compared image characteristic is found in the part database 40, the comparison unit 32 sends a comparison result indicating matching, at the same time, reads out data that is associated with the image characteristic which coincided with the to-be-compared image characteristic and registered in the part database 40, and sends the data to the attachment tool 20. For example, it is also possible to send a work parameter to the attachment tool 20 together with the image characteristic and allow the communication control unit 22 of the attachment tool 20 to set the received work parameter to the tool. Further, it is also possible to send information of a position where a part is to be attached to the attachment tool 20 together with the image characteristic and allow a display of the attachment tool 20 to display the position where the part is to be attached, thereby notifying workers about the position.

Figure 10:
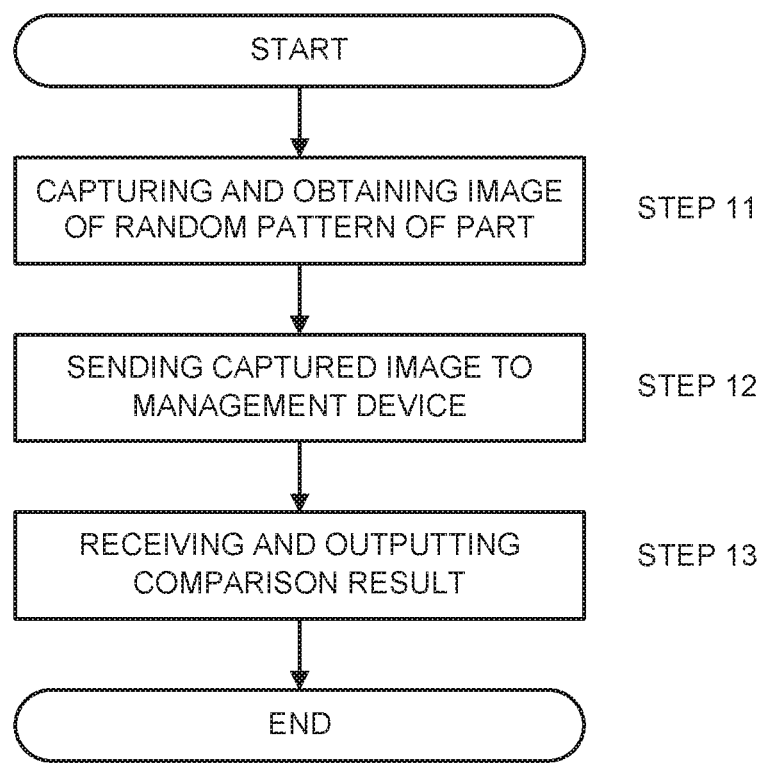
FIG. 10 is a flow chart illustrating an operation of an attachment tool of the second exemplary embodiment.

An operation of the attachment tool 20 in the second exemplary embodiment will be described below referring to a flow chart of FIG. 10.

The image capturing unit 21 captures and obtains an image of a random pattern provided on a comparison region of a part to be subjected to work (Step 11), and sends the captured image to the management device 30 via the communication control unit 22 (Step 12).

Then, the communication control unit 22 receives a comparison result from the management device 30 via the communication control unit 22, and the identification result-outputting unit 23 outputs the comparison result (Step 13).

Figure 11:
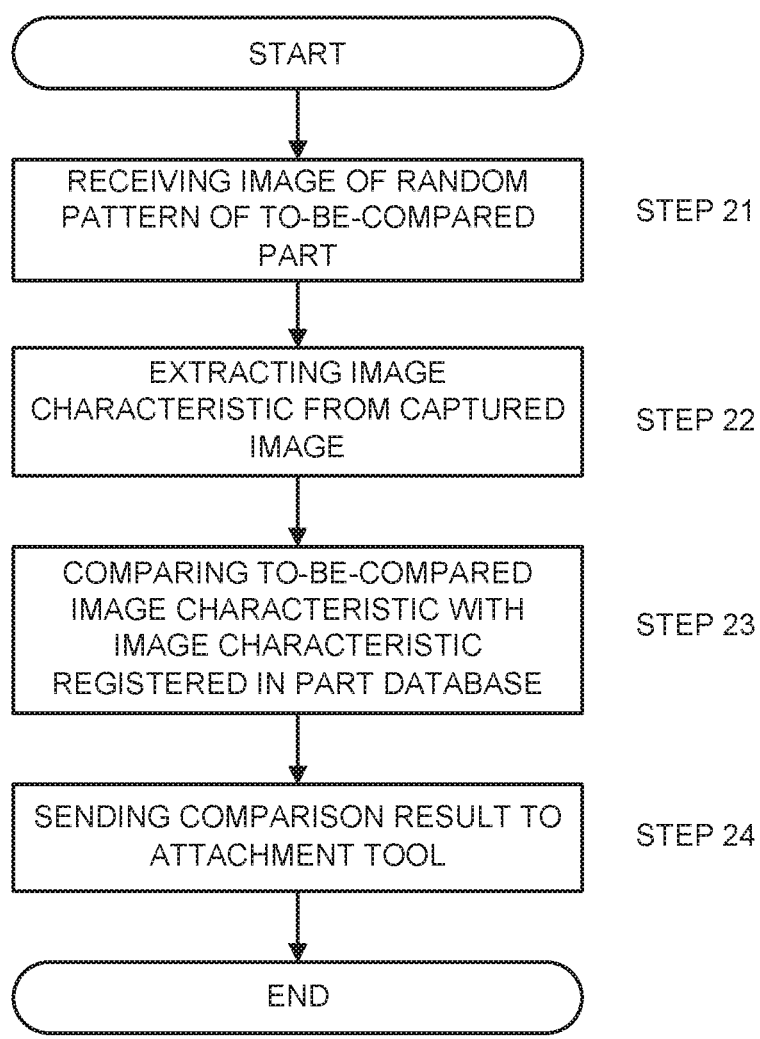
FIG. 11 is a flow chart illustrating an operation of a comparison device of the second embodiment.

An operation of processing performed by the management device 30 in the second exemplary embodiment will be described below referring to a flow chart of FIG. 11.

When the comparison unit 32 receives an image of a random pattern of a to-be-compared part from the attachment tool 20 (Step 21), the comparison unit 32 extracts an image characteristic from the received image (Step 22).

The comparison unit 32 performs comparison processing for comparing thus extracted image characteristic with an image characteristic of a random pattern of a part, the image characteristic being registered in the part database 40 (Step 23), and sends a comparison result thereof to the attachment tool 20 (Step 24).

Incidentally, in the above description, an image characteristic is extracted from an image of a random pattern on a side of the management device 30, but not limited thereto. It is also possible that an image characteristic is extracted from an image on a side of the attachment tool 20 and sent to the management device 30.

Third Exemplary Embodiment

A third embodiment will be described below. The third exemplary embodiment is directed to a system in which comparison processing of an image of a random pattern of a part, the image being captured by the attachment tool, is performed on a side of the attachment tool.

Figure 12:
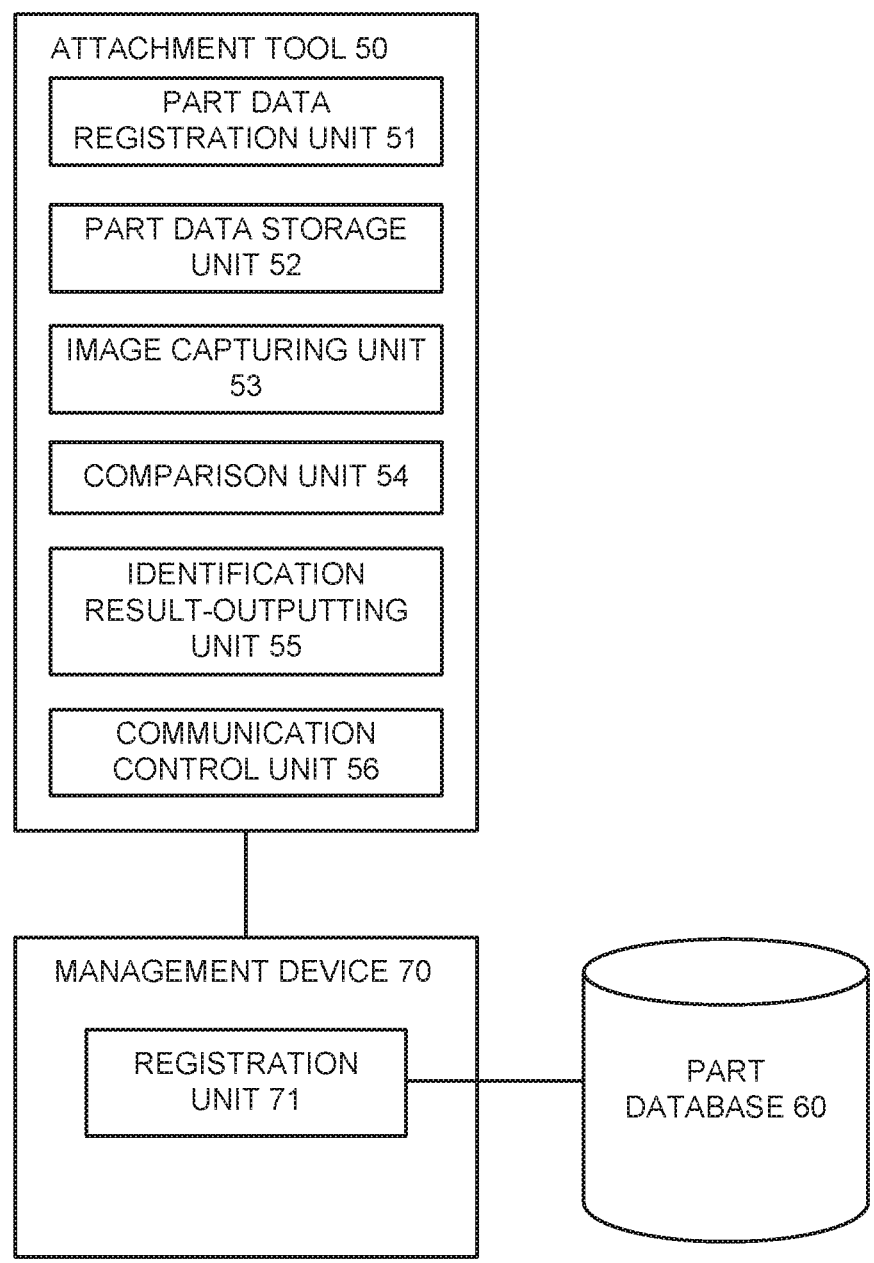
FIG. 12 is a block diagram of a third exemplary embodiment.

FIG. 12 is a block diagram of a work management system according to the third embodiment.

The work management system according to the third exemplary embodiment includes an attachment tool 50, a part database 60, and a management device 70. These components are connected with each other via a network.

The attachment tool 50 includes a part data registration unit 51, a part data storage unit 52, an image capturing unit 53, a comparison unit 54, an identification result-outputting unit 55, and a communication control unit 56.

The image capturing unit 53 and the identification result-outputting unit 55 have functions and configurations equivalent to those of the image capturing unit 11 and the identification result-outputting unit 12 of the first exemplary embodiment, respectively.

For example, the part data registration unit 51 receives an image characteristic and data related thereto which are to be registered in the attachment tool among image characteristics and data related thereto which are stored in the part database 60 via the management device 70 and via the communication control unit 56 and registers the received image characteristic and data related thereto to the part data storage unit 52.

The comparison unit 54 extracts an image characteristic from an image obtained by the image capturing unit 53 and compares the extracted image characteristic with an image characteristic registered in the image characteristic storage unit 52.

The part database 60 has a function and a configuration equivalent to those of the part database 40 of the second embodiment.

The management device 70 includes a registration unit 71. The registration unit 71 has a function and a configuration equivalent to those of the registration unit 31 of the management device 30 of the second exemplary embodiment and sends a whole or a portion of an image characteristic and data related thereto which are stored in the part database 60 to the attachment tool 50.

Figure 13:
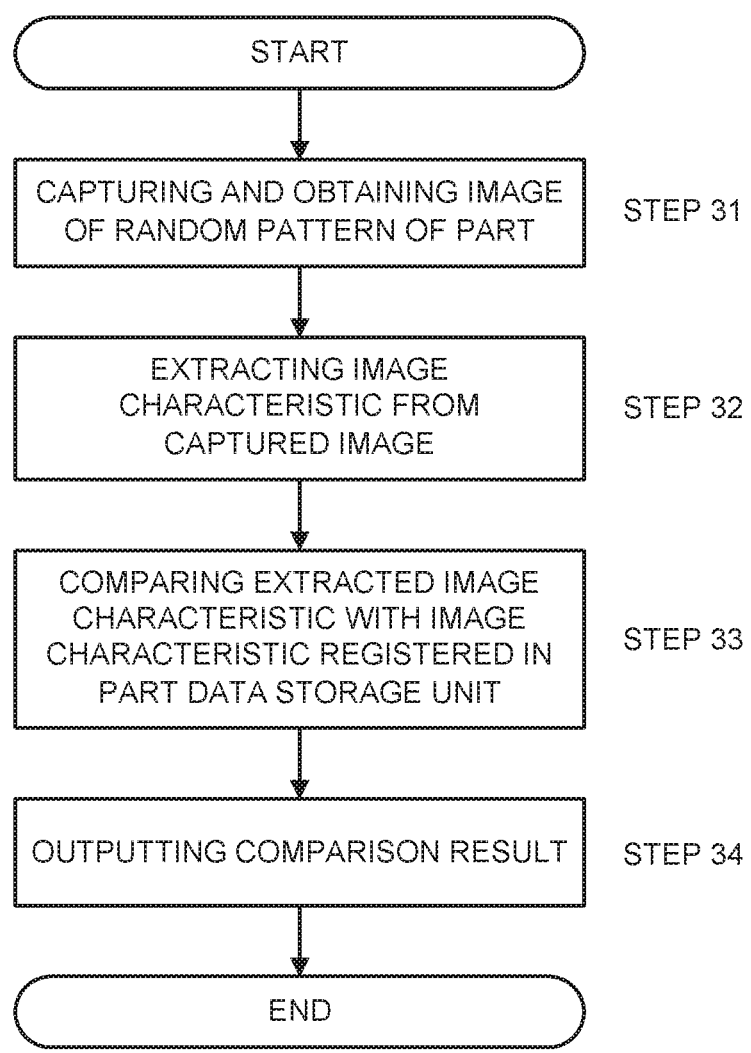
FIG. 13 is a flow chart illustrating an operation of an attachment tool of the third embodiment.

An operation of comparison processing performed by the attachment tool 50 in the third exemplary embodiment will be described below referring to a flow chart of FIG. 13.

The image capturing unit 53 captures and obtains an image of a random pattern provided on a comparison region of a part to be subjected to work (Step 31).

The comparison unit 54 extracts an image characteristic from the captured image (Step 32) and performs comparison processing for comparing the extracted image characteristic with an image characteristic registered in the part data storage unit 52 (Step 33).

The identification result-outputting unit 55 outputs a comparison result thereof (Step 34).

Fourth Exemplary Embodiment

A fourth embodiment will be described below. The fourth exemplary embodiment is directed to a system configured to store data of work record of work performed by an attachment tool and analyze thus accumulated data.

Figure 14:
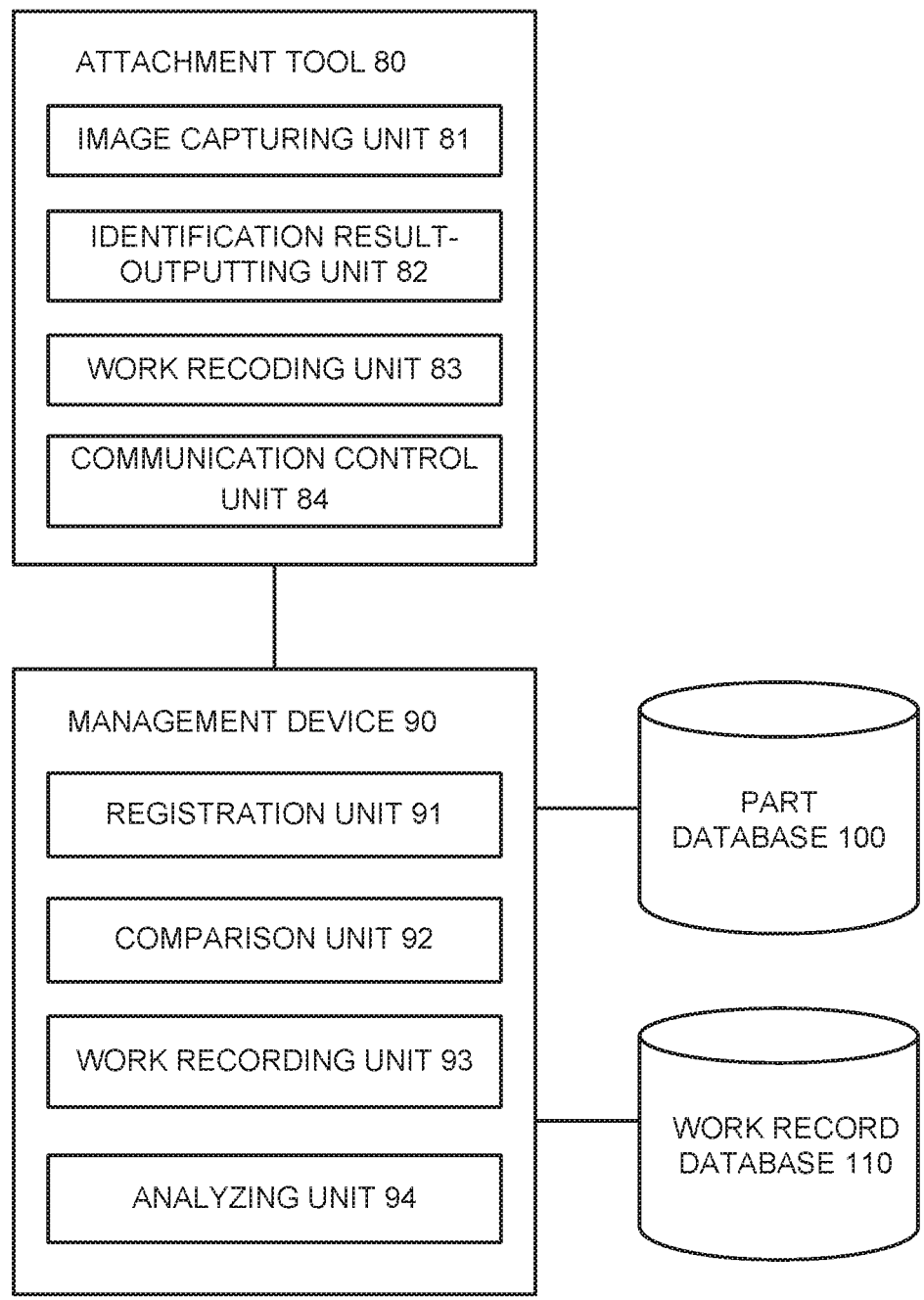
FIG. 14 is a block diagram of a fourth exemplary embodiment.

FIG. 14 is a block diagram of a work management system according to the fourth embodiment.

The work management system according to the fourth exemplary embodiment includes an attachment tool 80, a management device 90, a part database 100, and a work record database 110. These components are connected with each other via a network. The part database 100 has a function and a configuration equivalent to those of the part database of the second exemplary embodiment.

The attachment tool 80 includes an image capturing unit 81, an identification result-outputting unit 82, a work recoding unit 83, and a communication control unit 84.

The image capturing unit 81, the identification result-outputting unit 82, and the communication control unit 84 have functions and configurations equivalent to those of the image capturing unit 21, the identification result-outputting unit 22, and the communication control unit 23 of the second exemplary embodiment, respectively.

When the work recording unit 83 completes attaching or checking of a part by using the attachment tool, the work recording unit 83 generates work record information related to the work (e.g., a work date, a work type, a state (e.g., torque value, etc.)) and sends the work record information to the management device 90 via the communication control unit 84 together with an image of a random pattern of a part or an image characteristic thereof.

The management device 90 includes a registration unit 91, a comparison unit 92, a work recording unit 93, and an analyzing unit 94.

The registration unit 91 and the comparison unit 92 have functions and configurations equivalent to those of the registration unit 31 and the comparison unit 32 of the second exemplary embodiment, respectively.

The work recording unit 93 stores the work record information received from the attachment tool in the work record database 110 on the basis of the image characteristic. Data to be stored in the work record database 110 is exemplified in FIG. 15.

The analyzing unit 94 performs data analysis processing on the work record accumulated in the work record database 110. In the data analysis processing, analysis for design improvement and work efficiency is performed. For example, it is also possible to analyze which position that a part is attached to is prone to be loosened. In this case, it is also possible to extract all parts of which torque value has loosened to a prescribed value or more within a prescribed period (e.g., within one month) from the work record database 110, classify the extracted parts by a position where it is attached to, and determine positions where the number of loosened parts is larger than the prescribed value as "positions where the attached parts are prone to be loosened". Further, it is also possible, on the basis of a work date of each of different kinds of parts to be used in assembling a plurality of the same kind of products, to calculate the time required for attaching the each of different kinds of parts to the corresponding positions and analyze positions of which work efficiency is poor. In this case, it is also possible to extract all parts attached to the same kind of products from the work record database 110, classify the extracted parts by positions where they are attached to, calculate an average value of work time for each of different attaching positions, and determine positions, etc. where the calculated average value of the work time is higher than a prescribed value or positions of which difference obtained in comparison with the calculated average value of the work time for each of different attaching positions and an average value of work time of each part in the whole product (all positions where parts are attached to) is higher than a prescribed value as "positions where work efficiency is poor".

According to the present exemplary embodiment, it is possible to obtain a work record automatically while working. Further, it is also possible to obtain a work record accumulated and stored (Big Data) and perform analysis of work quality by using it.

Incidentally, it is also possible to apply the fourth embodiment to the first embodiment or the third embodiment.

As it is apparent from the above description, it is possible to configure each unit with hardware. It is also possible to realize each unit in a computer program. In this case, a processor operated by a program stored in a program memory is caused to realize a function and an operation equivalent to those of the above described exemplary embodiments.

Figure 16:
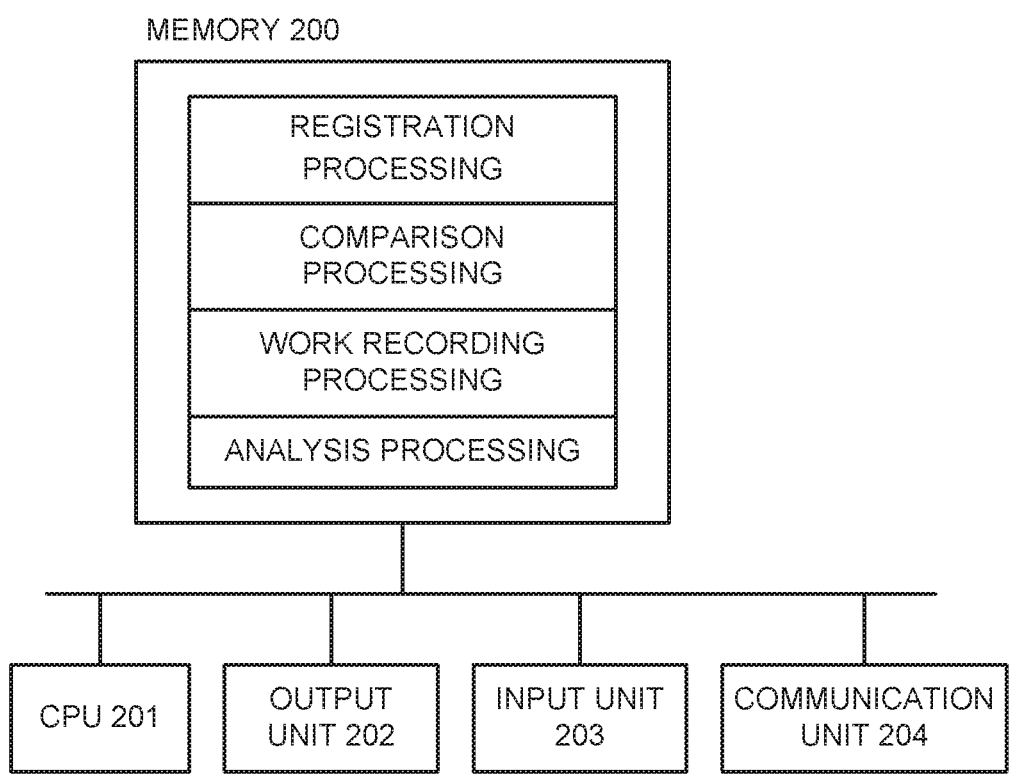
FIG. 16 illustrates an example of a configuration of a computer operated by a program.
Figure 17:
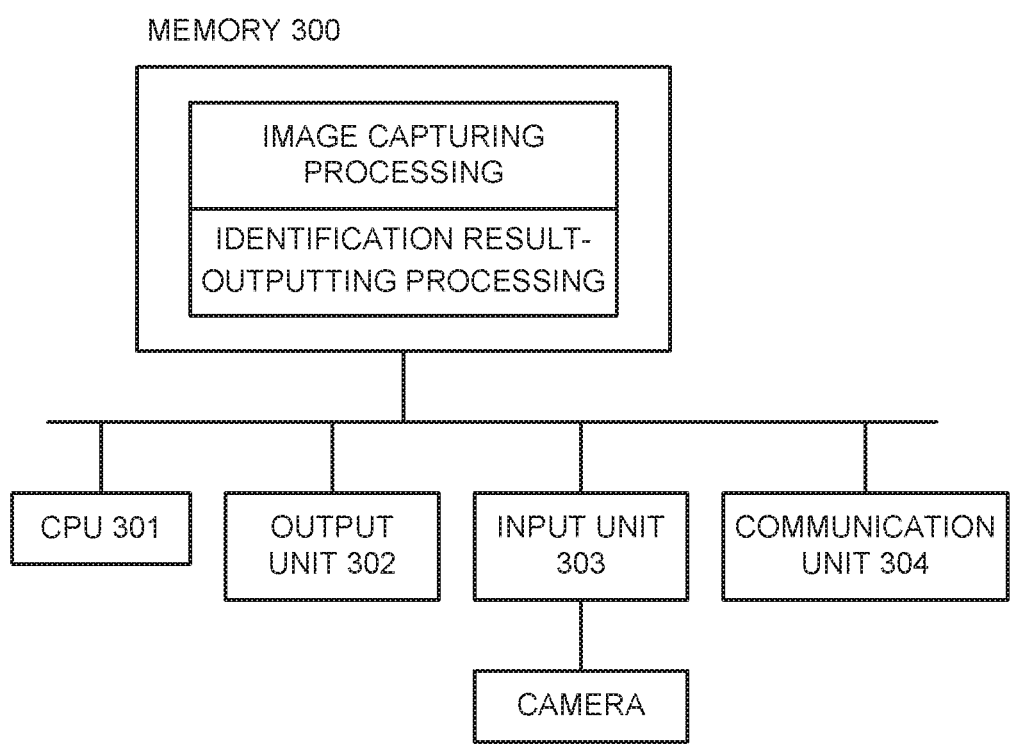
FIG. 17 illustrates another example of a configuration a computer operated by a program.

More specifically, as illustrated in FIG. 16, the function and the operation of each unit can be realized by a computer composed of a memory 200, a CPU 201, an output unit 202, an input unit 203, and a communication unit 204. In this case, the memory 200 stores a program that performs processing corresponding to processing performed by the registration unit 91, the comparison unit 92, the work recording unit 93, and the analyzing unit 94 of the management device 90. With the configuration, the CPU 201 executes the program stored in the memory 200, thereby realizing functions of the part data registration unit 91, the comparison unit 92, the work recording unit 93, and the analyzing unit 94. It is possible to input the received comparison image via the input unit 203 or the communication unit 204. Further, it is possible to output a comparison result to the output unit 202 (e.g., a display) or send a comparison result to an external terminal via the communication unit 204. Similar for the attachment tools 10, 20, 50, 80 and the management devices 30, 70, a program that performs processing corresponding to processing performed by the above described each unit is stored in the memory 200 and the CPU 201 executes the program stored in the memory 200, thereby realizing a function of each unit of the attachment tools 10, 20, 50, 80 and the management devices 30, 70. For example, in a case of the attachment tool 10, as illustrated in FIG. 17, the function of each unit can be realized by a computer including a memory 300, a CPU 301, an output unit 302, an input unit 303, and a communication unit 304. The memory 300 stores a program that performs processing corresponding to processing performed by the image capturing unit 11 and the identification result-outputting unit 12 of the attachment tool 10. The CPU 301 executes the program stored in the memory 300, thereby realizing functions of the image capturing unit 11 and the identification result-outputting unit 12. The input unit 303 is connected to a camera. The camera receives an instruction to capture an image through the input unit 303. Accordingly, an image is obtained.

Figure 18:
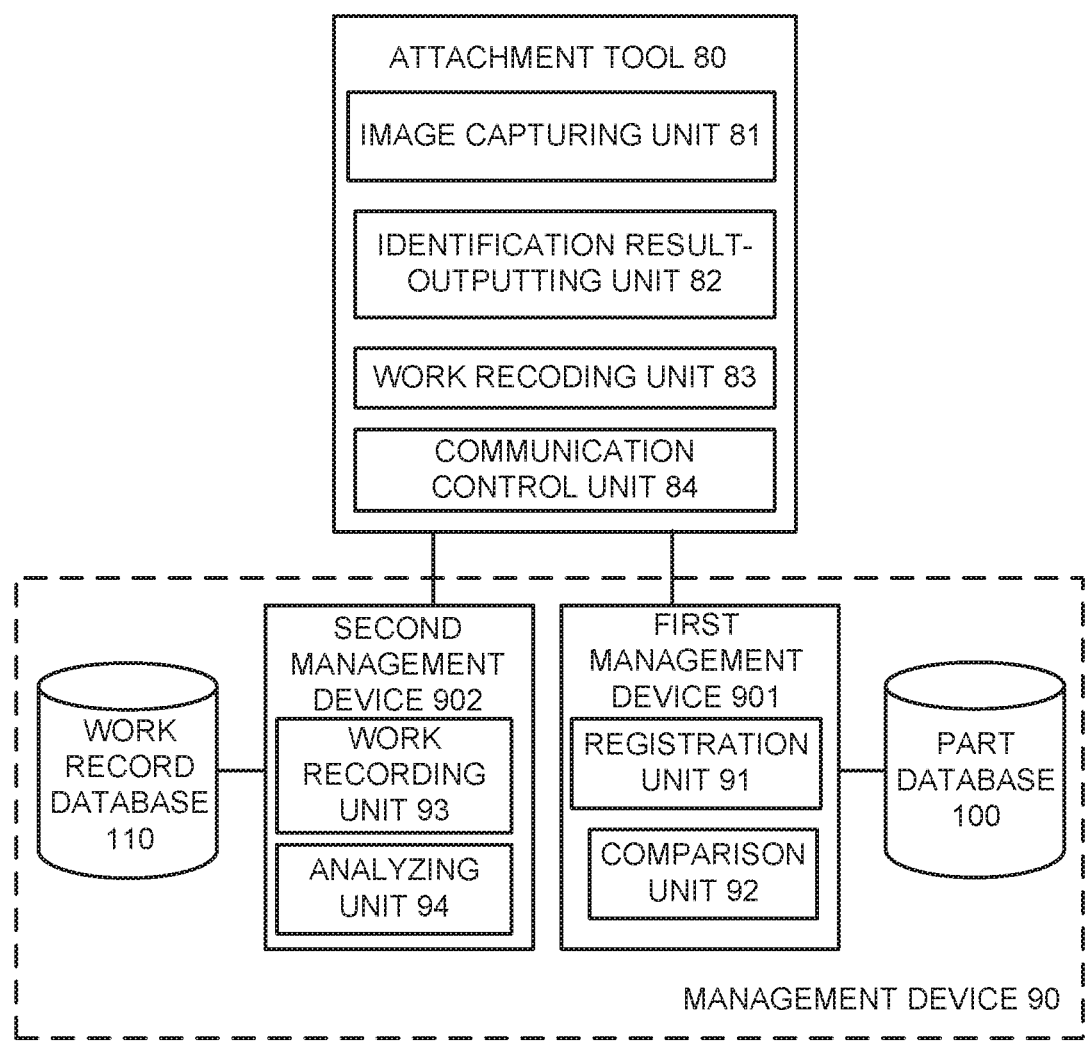
FIG. 18 illustrates another system configuration of the fourth exemplary embodiment.

In the fourth exemplary embodiment, it is possible to configure the management device 90 with a first management device 901 including a registration unit 91 and a comparison unit 92 and a second management device 902 including the work recording unit 93 and the analyzing unit 94. A system configuration of this case is illustrated in FIG. 18.

A function of each of the first management device 901 and the second management device 902 can be realized by a computer composed of a memory, a CPU, an output unit, an input unit, and a communication unit. In a case of the first management device 901, the memory stores a program that performs processing corresponding to processing of the registration unit 91 and the comparison unit 92. When the CPU executes the program stored in the memory, functions of the registration unit 91 and the comparison unit 92 are realized. In a case of the second management device 902, the memory stores a program that performs processing corresponding to processing of the work recording unit 93 and the analyzing unit 94. When the CPU executes the program stored in the memory, functions of the work recording unit 93 and the analyzing unit 94 are realized.

The whole or part of the exemplary embodiments disclosed above can be described as, but not limited to, the following supplementary notes.

(Supplementary Note 1)

An attachment tool comprising
an image capturing unit configured to capture an image of a random pattern provided on a comparison region of a part, and
an identification result-outputting unit configured to output a part identification result obtained by comparing an image characteristic of the captured image of the random pattern with a previously stored image characteristic of a random pattern of a part.

(Supplementary Note 2)

The attachment tool according to supplementary note 1, wherein the image capturing unit is provided in such a manner that the image capturing unit faces to a comparison region of a part when the part is gripped by the attachment tool.

(Supplementary Note 3)

The attachment tool according to supplementary note 1 or supplementary note 2, further comprising a communication control unit configured to
send the image of the random pattern or an image characteristic extracted from the image of the random pattern to a comparison device, and
receive a comparison result from the comparison device, the comparison result being obtained by comparing the image characteristic extracted from the image of the random pattern with a previously stored image characteristic of a random pattern of a part, the image characteristic being stored in an image characteristic storage unit.

(Supplementary Note 4)

The attachment tool according to supplementary note 1 or supplementary note 2 further comprising an image characteristic storage unit storing an image characteristic of a random pattern of a part previously, an image characteristic extraction unit configured to extract an image characteristic from the captured image, and a comparison unit configured to identify the part by comparing the extracted image characteristic with an image characteristic stored in the storage means.

(Supplementary Note 5)

The attachment tool according to any one of supplementary note 1 to supplementary note 4, wherein the random pattern is provided by a die, and wherein an image characteristic of a random pattern of a part is obtained for each die and stored in the image storage unit.

(Supplementary Note 6)

The attachment tool according to any one of supplementary note 1 to supplementary note 4, wherein the random pattern is provided for each individual part, and wherein an image characteristic of a random pattern of a part is obtained for each individual part and registered in the image characteristic storage unit.

(Supplementary Note 7)

The attachment tool according to any one of supplementary note 1 to supplementary note 6, further comprising a work record unit configured to generate work record information of work performed by using the part and send the information to a work recording device together with the image characteristic of the random pattern of the part.

(Supplementary Note 8)

The attachment tool according to any one of supplementary note 1 to supplementary note 7, further including a covering part having a shape covering an area where the random pattern for the part is provided, a partially-dark-colored surface corresponding to a range in a predetermined angle from a normal direction and facing to the area where the random pattern is provided, and a light dispersing-and-emitting surface corresponding to a range in an angle other than the above predetermined angle.

(Supplementary Note 9)

A work management method comprising, capturing an image of a random pattern provided on a comparison region of a part by an attachment tool, and outputting a part identification result obtained by comparing an image characteristic of the image of the random pattern with a previously stored image characteristic of a random pattern of a part by the attachment tool.

(Supplementary Note 10)

The work management method according to supplementary note 9, wherein an image capturing unit is provided in such a manner that the image capturing unit faces to a comparison region of a part when the part is gripped by the attachment tool.

(Supplementary Note 11)

The work management method according to supplementary note 9 or supplementary note 10 comprising, comparing, by a comparison device, the image characteristic extracted from the image of random pattern captured by the attachment tool with a previously stored image characteristic of a random pattern of a part, the image characteristic being stored in an image characteristic storage unit.

(Supplementary Note 12)

The work management method according to supplementary note 9 or supplementary note 10 comprising, comparing, by the attachment tool, the image characteristic extracted from the image of random pattern captured by the attachment tool with a previously stored image characteristic of a random pattern of a part, the image characteristic being stored in an image characteristic storage unit.

(Supplementary Note 13)

The work management method according to any one of supplementary note 9 to supplementary note 12, wherein the random pattern is provided by a die, and wherein the image storage unit stores an image characteristic of a random pattern of a part, the image characteristic being obtained for each die.

(Supplementary Note 14)

The work management method according to any one of supplementary note 9 to supplementary note 12, wherein the random pattern is provided for each individual part, and wherein the image characteristic storage unit registers an image characteristic of a random pattern of a part, the image characteristic being obtained for each individual.

(Supplementary Note 15)

The work management method according to any one of supplementary note 9 to supplementary note 14 comprising, generating work record information of work performed by using the part and sending the information to a work recording device together with the image characteristic of the random pattern of the part by the attachment tool, and wherein the work recording device stores the work record information in a work record storage unit in association with an image characteristic.

(Supplementary Note 16)

The work management method according to any one of supplementary note 9 to supplementary note 15 comprising, performing analysis processing for the work by using work record information accumulated and stored in the work record storage unit.

(Supplementary Note 17)

The work management method according to any one of supplementary note 9 to supplementary note 15, wherein, in a covering part formed to cover a region on which the random pattern of the part is provided, a surface corresponding to a range in a predetermined angle from a normal direction and facing to the area where the random pattern is provided is a dark color, and a surface corresponding to a range in an angle other than the above predetermined angle disperses light.

(Supplementary Note 18)

A work management system comprising an attachment tool including an image capturing unit configured to capture an image of a random pattern provided on a comparison region of a part and an identification result-outputting unit configured to output a part identification result obtained by comparing an image characteristic of the image of the random pattern with a previously stored image characteristic of a random pattern of a part, and a comparison unit configured to compare the image characteristic extracted from the image of the random pattern captured by the image capturing unit with a previously stored image characteristic of a random pattern of a part, the image characteristic being stored in an image characteristic storage unit.

(Supplementary Note 19)

A comparison device for comparing an image characteristic extracted from an image of a random pattern that is provided on a comparison region of a part and captured by an attachment tool with a previously stored image characteristic of a random pattern of a part, the image characteristic being stored in an image characteristic storage unit.

(Supplementary Note 20)

A program causing a computer to execute processing, wherein the processing comprises comparing an image characteristic extracted from an image of a random pattern that is provided on a comparison region of a part and captured by an attachment tool with a previously stored image characteristic of a random pattern of a part, the image characteristic being stored in an image characteristic storage unit.

(Supplementary Note 21)

An attachment tool comprising
a memory, and
a processor,
wherein the processor
captures an image of a random pattern provided on a comparison region of a part, and
outputs a part identification result obtained by comparing an image characteristic of the image of the random pattern with a previously stored image characteristic of a random pattern of a part.

While the invention has been particularly shown and described with reference to exemplary embodiments thereof, the invention is not limited to these exemplary embodiments. It will be understood by those of ordinary skill in the art that various changes in form and details may be made therein without departing from the sprit and scope of the present invention as defined by the claims. This application claims the benefit of Japanese Application No. 2015-66499, filed Mar. 27, 2015, the disclosure of which is hereby incorporated by reference.

REFERENCE CHARACTER LIST

10, 20, 50, 80 attachment tool
11, 21, 53, 81 image capturing unit
12, 22, 55, 82 identification result-outputting unit
23, 56, 84 communication control unit
30, 70, 91 management device
31, 71, 91 registration unit
32, 54, 92 comparison unit
40, 60 part database
51 part data registration unit
52 part data storage unit
83, 93 work recording unit
94 analyzing unit
100 part database
110 work record database
200, 300 memory
201, 301 CPU
202, 302 output unit
203, 303 input unit
204, 304 communication unit
901 first management device
902 second management device

The invention claimed is:

1. An attachment tool comprising:
a camera capturing an image of a random pattern provided on a comparison region of a part;
a covering part having a shape covering an area where the random pattern for the part is provided comprising a partially-dark-colored surface corresponding to a range in a predetermined angle from a normal direction and facing the area where the random pattern is provided, and a light dispersing-and-emitting surface corresponding to a range in an angle other than the predetermined angle;
a memory storing instructions; and
a processor executing the instructions to perform:
obtaining a result of comparing an image characteristic of the captured image of the random pattern of the part with a previously stored image characteristic of the random pattern of the part, and
outputting the result of the comparing indicating matching or mismatch.

2. The attachment tool according to claim 1, wherein the camera is provided in such a manner that the camera faces the comparison region of the part when the part is gripped by the attachment tool.

3. The attachment tool according to claim 1, wherein:
the processor performs:
sending the image of the random pattern or the image characteristic extracted from the image of the random pattern to a comparison device, and
receiving a comparison result from the comparison device, the comparison result being obtained by comparing the image characteristic extracted from the image of the random pattern with the previously stored image characteristic of another random pattern of another part, the image characteristic being stored in an image characteristic storage device.

4. The attachment tool according to claim 1 further comprising:
a storage device storing the image characteristic of a random pattern of a part previously,
wherein the processor performs:
extracting the image characteristic from the captured image; and
identifying the part by comparing the extracted image characteristic with an image characteristic stored in an image characteristic storage device.

5. The attachment tool according to claim 1:
wherein the random pattern is provided by a die; and
wherein the image characteristic of the random pattern of the part is obtained for each die and stored in a storage device.

6. The attachment tool according to claim 1,
wherein the random pattern is provided for each individual part; and
wherein the image characteristic of the random pattern of the part is obtained for each individual part and registered in a storage device.

7. The attachment tool according to claim 1, wherein the processor performs:
generating work record information of work performed by using the part and sending the information to a work recording device together with the image characteristic of the random pattern of the part.

8. The attachment tool according to claim 1, wherein the part is at least one of a bolt, a screw, a nut, lenses, a switch, a semiconductor chip, a plastic part and a fastening part.

9. A work management method comprising:
capturing an image of a random pattern provided on a comparison region of a part by a camera comprised in an attachment tool, wherein, a covering part formed to cover a region on which the random pattern of the part is provided comprises a partially-dark-colored surface corresponding to a range in a predetermined angle from a normal direction and facing the area where the random pattern is provided, and a light dispersing-andemitting surface corresponding to a range in an angle other than the predetermined angle; and obtaining a result of comparing an image characteristic of the captured image of the random pattern of the part with a previously stored image characteristic of the random pattern of the part, and outputting the result of the comparing indicating matching or mismatch, by the attachment tool.

10. The work management method according to claim 9, wherein the camera is provided in such a manner that the camera faces the comparison region of the part when the part is gripped by the attachment tool.

11. The work management method according to claim 9 comprising:

comparing, by a comparison device, the image characteristic extracted from the image of random pattern captured by the attachment tool with the previously stored image characteristic of another random pattern of another part, the image characteristic being stored in a storage device.

12. The work management method according to claim 9 comprising:

comparing, by the attachment tool, the image characteristic extracted from the image of random pattern captured by the attachment tool with the previously stored image characteristic of another random pattern of another part, the image characteristic being stored in a storage device.

13. The work management method according to claim 9:

wherein the random pattern is provided by a die; and wherein the image characteristic of the random pattern of the part is stored in a storage device, the image characteristic being obtained for each die.

14. The work management method according to claim 9:

wherein the random pattern is provided for each individual part; and wherein a storage device registers the image characteristic of the random pattern of the part, the image characteristic being obtained for each individual.

15. The work management method according to claim 9 comprising:

generating work record information of work performed by using the part and sending the information to a work recording device together with the image characteristic of the random pattern of the part by the attachment tool; and wherein the work recording device stores the work record information in a storage device in association with the image characteristic.

16. The work management method according to claim 15 comprising:

performing analysis processing for the work by using work record information accumulated and stored in the storage device.

17. A comparison device comprising:

a memory storing instructions; and a processor executing the instructions to perform:

comparing an image characteristic extracted from an image of a random pattern that is provided on a comparison region of a part and captured by a camera comprised in an attachment tool with a previously stored image characteristic of the random pattern of the part, the image characteristic being stored in storage device, wherein, a covering part formed to cover a region on which the random pattern of the part is provided comprises a partially-dark-colored surface corresponding to a range in a predetermined angle from a normal direction and facing the area where the random pattern is provided, and a light dispersing-and-emitting surface corresponding to a range in an angle other than the predetermined angle; and outputting the result of the comparing.

* * * * *

UNITED STATES PATENT AND TRADEMARK OFFICE
CERTIFICATE OF CORRECTION

| | | |
|---|---|---|
| PATENT NO. | : 10,592,772 B2 | Page 1 of 1 |
| APPLICATION NO. | : 15/561562 | |
| DATED | : March 17, 2020 | |
| INVENTOR(S) | : Rui Ishiyama, Takayuki Abe and Kayato Sekiya | |

It is certified that error appears in the above-identified patent and that said Letters Patent is hereby corrected as shown below:

In the Specification

Column 10, Description of Exemplary Embodiments, Line 33; After "database", insert --40--

Signed and Sealed this
Fourteenth Day of July, 2020

Andrei Iancu
*Director of the United States Patent and Trademark Office*